United States Patent
Boccadoro et al.

[11] Patent Number: 6,121,568
[45] Date of Patent: Sep. 19, 2000

[54] ELECTRICAL DISCHARGE MACHINE WITH AT LEAST ONE WIRE ELECTRODE AND METHOD OF MACHINING A WORKPIECE IN SUCH A MACHINE

[75] Inventors: Marco Boccadoro, Verscio; Ivano Beltrami, Cavigliano, both of Switzerland

[73] Assignee: Agie SA, Switzerland

[21] Appl. No.: 09/059,816

[22] Filed: Apr. 14, 1998

[30] Foreign Application Priority Data

Apr. 15, 1997 [DE] Germany ............... 197 15 687

[51] Int. Cl.[7] ............................................. B23H 1/00
[52] U.S. Cl. .................................. 219/69.12; 219/69.11; 219/68
[58] Field of Search ............... 219/69.12, 69.11, 219/68

[56] References Cited

U.S. PATENT DOCUMENTS

| | | | |
|---|---|---|---|
| 3,614,579 | 10/1971 | Fulton | 318/676 |
| 3,830,996 | 8/1974 | Ullmann et al. | |
| 4,232,208 | 11/1980 | Buhler | 219/69 |
| 4,242,556 | 12/1980 | Ullmann et al. | 219/69 W |
| 4,301,349 | 11/1981 | Inoue | 219/69 W |
| 4,358,655 | 11/1982 | Inoue | |
| 4,431,896 | 2/1984 | Lodetti | 219/69 |
| 4,460,816 | 7/1984 | Bonga | 219/69 |
| 4,485,286 | 11/1984 | Inoue | |
| 4,485,288 | 11/1984 | Schneider | 219/69 |
| 4,703,144 | 10/1987 | Goto et al. | 219/69 P |
| 4,727,278 | 2/1988 | Staufenberg | 310/328 |
| 4,751,362 | 6/1988 | Girardin | |
| 4,883,934 | 11/1989 | Mamin | 219/69 |
| 5,012,063 | 4/1991 | Kawanabe et al. | |
| 5,214,260 | 5/1993 | Fricke | |
| 5,384,443 | 1/1995 | Swartzbaugh | |
| 5,438,178 | 8/1995 | Buhler et al. | |
| 5,605,638 | 2/1997 | Fujita | 219/69.14 |

FOREIGN PATENT DOCUMENTS

| | | |
|---|---|---|
| 60259324 | 12/1985 | European Pat. Off. |
| 86131931 | 5/1986 | Germany |
| 2954584C2 | 11/1988 | Germany |
| 4228330 | 3/1994 | Germany |
| 197156878 | 12/1997 | Germany |
| 60-061853 | 3/1985 | Japan |
| 60-174052 | 8/1985 | Japan |
| 62-170015 | 7/1987 | Japan |
| 8-229742A | 9/1996 | Japan |

OTHER PUBLICATIONS

Development of Spherical Ultrasonic Motor; Shigeki Toyama, Tokyo A&T University, Japan Submitted by: A. Kobayashi (1) Received on Jan. 4, 1996.
Piezoelectrically Driven Rotational Joint with Three Degrees of Freedom Kawasaki Heavy Industries, LTD, p. 9, no date available.
Ultraschall Treibt Minimotor An by: Noldechen, p. 43/86, no date available.
A List of Citations, no date available.

*Primary Examiner*—Patrick Ryan
*Assistant Examiner*—M. Alexandra Elve
*Attorney, Agent, or Firm*—Gifford, Krass, Groh, Sprinkle, Anderson & Citkowski, P.C.

[57] ABSTRACT

An electrical discharge machine with at least one wire electrode (30) in which the wire electrode (30) runs between two guide heads (10,10'). At least one, in particular, both, guide heads (10,10') are formed to be at least partially spherical. At least one of the guide heads (10,10') is seated in a manner suited for spherical rotations. Alternatively or additionally, a drive means is provided for the spherical rotation of at least one guide head (10,10'). The spatial position of the wire electrode (30), in particular, its conical angle, can be adjusted completely or essentially by subjecting the two opposing spherical guide heads (10,10') to spherical rotations and/or a modification of spacing.

7 Claims, 5 Drawing Sheets

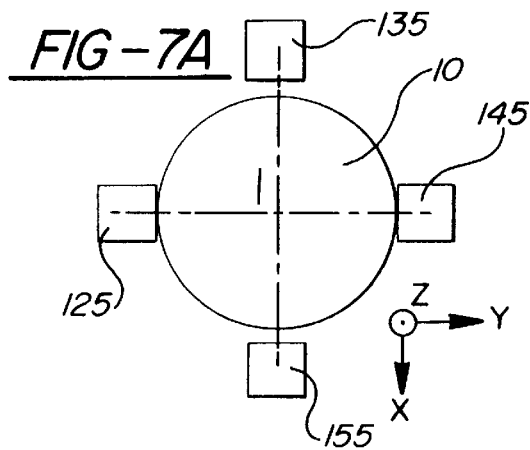
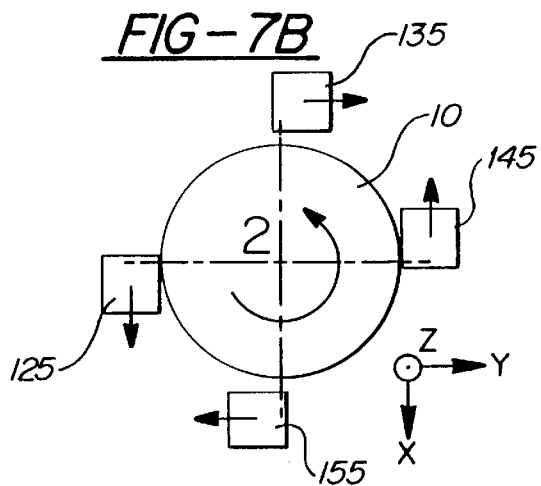
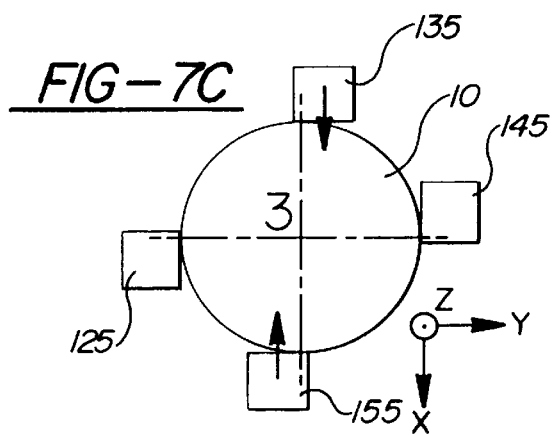
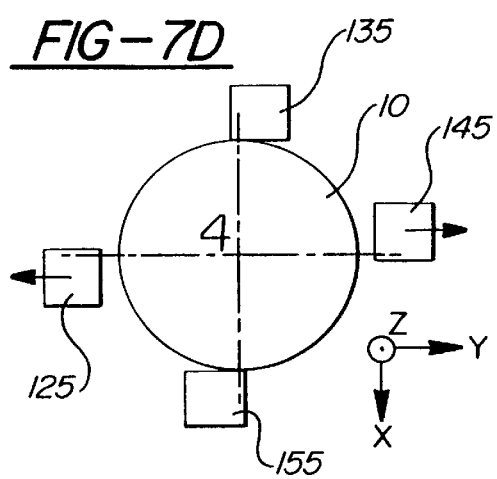
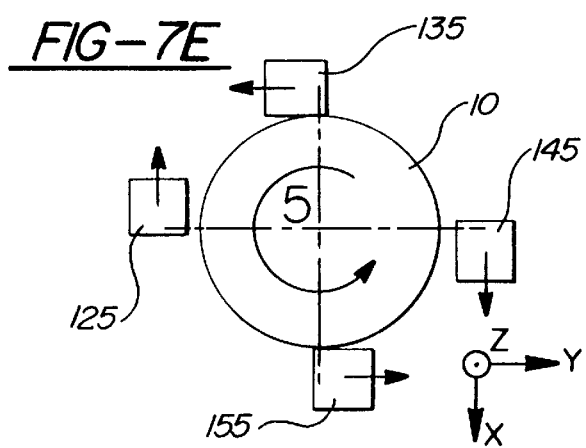

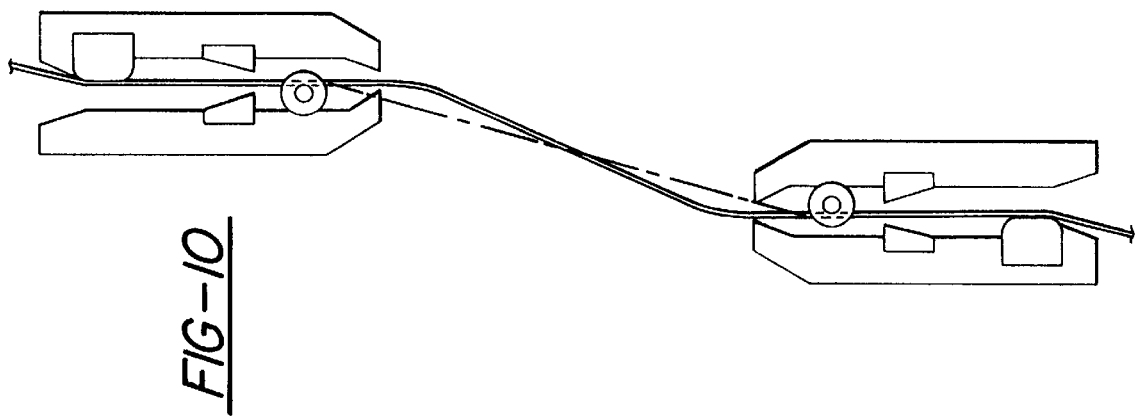
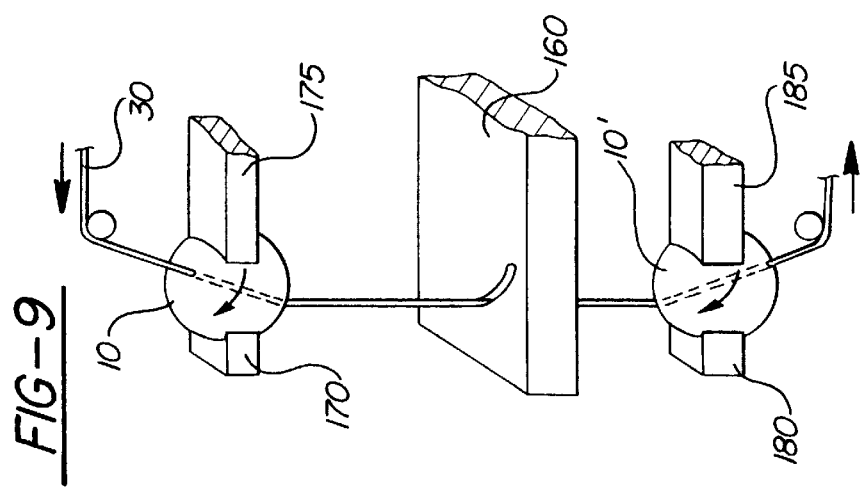
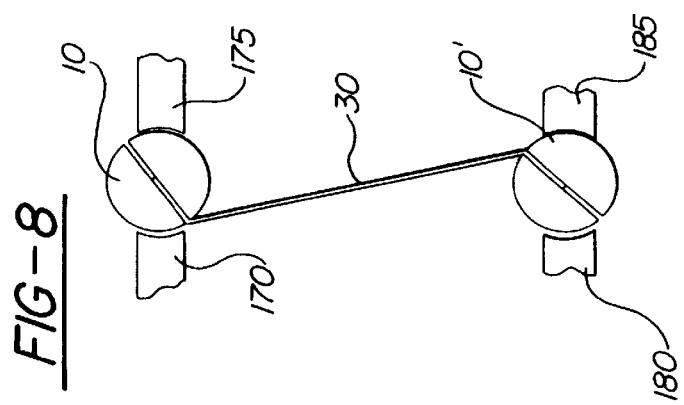

ELECTRICAL DISCHARGE MACHINE WITH AT LEAST ONE WIRE ELECTRODE AND METHOD OF MACHINING A WORKPIECE IN SUCH A MACHINE

FIELD OF THE INVENTION

The invention pertains to an electrical discharge machine with at least one wire electrode which runs between two guide heads. It also pertains to a method of machining a workpiece by means of such an electrical discharge machine.

BACKGROUND OF THE INVENTION

Electrical discharge machines serve for highly precise machining of electrically conductive workpieces. Therein material is removed by means of an electrode and a spark discharge.

Wire electrodes are used, for instance, to make cylindrical or conical cuts and to produce stamps or matrices in this manner. A section of a wire running between two guide heads is commonly referred to as a wire electrode. A tension generated in the wire path system ensures in this case the necessary straight linear shape of the electrode.

The term "guide head" is understood to mean a unit which is moved as a whole for the spatial positioning of the electrode. Generally, the actual wire guide is ordinarily formed in the interior of such a unit.

Each guide head is, for instance, seated in a cross carriage. Consequently, each can be displaced independently of the other in one of two typically parallel X-Y planes. It is practical in this regard if at least one of the cross carriages can be moved perpendicular to these planes in the Z direction. In this way it is possible to adjust the wire electrode to any given spatial position.

Cylindrical cuts are obtained in an EDM machine constructed in this manner by displacing both guide heads synchronously on similar paths in their respective guide planes. Conical cuts, on the contrary, are obtained by an asynchronous and/or unequal displacement of the guide heads.

For cylindrical cuts, therefore, the guide heads are generally exactly superimposed in the Z direction. For conical cuts, on the other hand, they are offset relative to one another.

For all cuts, what matters is merely the relative motion between the wire electrode and the workpiece. Cylindrical cuts are also obtained, for instance, if the workpiece is displaced in an X-Y direction with respect to a stationary wire electrode parallel to the Z axis, and conical cuts can be obtained if the workpiece and one guide head are moved, while the other guide head is held in place. It is also possible to pivot both guide heads each about an axis transverse to the Z axis and also to rotate them about the Z axis (in this case, each wire guide describes a circular orbit about the Z axis).

It is immaterial to the present invention whether the EDM machine is constructed in such a manner or a similar one. The only essential point is that in all these embodiments the guide heads are mutually offset or at least point in different directions. For reasons of simplicity, therefore, reference is made exclusively to the variant with two cross carriages in the description.

In case of a conical cut, the outlets of the guide heads for the wire electrode commonly point in or against the Z direction, while the wire electrode itself runs at an angle to it.

On the one hand, the erosion wire has a certain stiffness. Consequently, it initially leaves the wire outlet in or against the Z direction. Only as it continues is it bent towards the respective opposing guide head. The wire electrode thus no longer runs straight, but slightly curved (this is illustrated in FIG. 10).

On the other hand, the flushing of the wire electrode is disturbed. In the ideal case, the flushing should be done by a coaxial jet which runs symmetrically to the wire electrode. However, in the situation described above, this is no longer possible. This causes a deviation of the wire electrode out of its path by an asymmetrical flushing jet. The cooling action of the flushing jet is also no longer optimal.

German Patent No. DE 3041613 C1 (AGIE) attempts to remedy this problem by a cardan suspension of the guide heads. In this way it is possible to pivot the guide heads in the direction of the wire electrode. Such a design is relatively elaborate, however, and requires a great deal of space. It is also difficult to realize the design sufficiently stiffly. Consequently, it is very expensive to meet the current precision standards for erosion machines with this teaching.

German Patent No. DE 3201544 A1 (EROWA) takes a similar path by seating the guide heads so as to pivot and coupling them via a coupling transmission. In this way the control effort is reduced, which is nearly inconsequential, however, given the present state of development of control electronics. Moreover, such a construction increases the disadvantages cited with regard to the previous publication. This applies in particular to the stiffness problems.

SUMMARY OF THE INVENTION

The present invention attempts to make an improved wire EDM machine available.

It achieves this objective with an EDM machine with at least one wire electrode, in which the wire electrode runs between two guide heads and at least one of the guide heads is formed to be at least partially spherical. Preferably both guide heads are formed to be at least partially spherical.

With respect to prior art, therefore, value is placed for the first time on a concrete external shape of the guide heads that can be directly utilized technically. The guide heads thus obtain a new functionality. This fundamental innovation can be implemented economically with little effort and thus permits an effective and simple remedy for the above-described complex problem.

In a preferred embodiment, at least one of the guide heads is seated in a manner suitable for spherical rotations.

In this way, the guide heads orient themselves without external effort in the direction of the wire electrode for conical cuts. Since the erosion wire is under tension even outside the electrode region, an equilibrium position of the guide heads results. Depending on the angle and the design, this lies between an orientation of the guide heads parallel to the Z axis and an orientation parallel to the axis of the wire electrode.

If, for instance, the wire is constantly guided from the outside in the Z direction towards the guide head, deviations of the wire electrode from its nominal straight position can be reduced by roughly one-half without significant effort. Such a solution is of particular interest if an annular wire guide is employed in the interior of the guide head.

In another preferred configuration, drive means are provided for the spherical rotation of at least one guide head.

In this manner, it is possible to orient the guide heads exactly along the axis of the wire electrode. Insofar as an open wire guide is employed, this yields one additional considerable advantage:

Open wire guides are shaped, for instance, as a V-shaped groove. Therefore, wires of different dimensions can be placed in it. Of course, a force can be transferred with the aid of these essentially from only one direction (from the point of the V). During the machining of a workpiece, they must therefore be continuously rotated appropriately about the wire. This task can also be taken over by the spherical guide head equipped with drive means. There is no need for a separate construction, as proposed, for instance, in Swiss Patent No. CH 670590 (CHARMILLES).

As a result, therefore, an open wire guide can be optimally oriented relative to the wire, and the guide heads can simultaneously be aligned with the axis of the wire electrode.

Preferably, piezoceramic actuators are provided as actuators for at least one guide head. Such actuators can generate a high torque at very low speed. They are also particularly precise, small and uncomplicated.

The piezoceramic actuators are preferably constructed such that they bring about rotational motions of at least one guide head by frictional forces. This permits a particularly simple construction of a spherical motor.

In an additionally preferred embodiment, a series of piezoceramics form a motor of the inchworm or walking drive type. These are already mature piezoceramic actuators, which can be employed particularly well in the present invention.

In an alternatively or additionally preferred embodiment, the piezoceramic actuators are constructed such that they bring about translational motions of at least one guide head by changing their three-dimensional shape. In this manner, even tiny translational motions (lying in the micron range) of the guide head can be performed. Thus, it is possible, for example, to compensate for slight orientation errors on the workpiece with little effort.

Preferably, the piezoceramic actuators are coupled to at least one wire position sensor. This permits a particularly fast control system (time constant in the microsecond range; previously customary: milliseconds), which holds the spacing between the wire electrode and the workpiece constant. Thereby, for instance, even undesired lateral movements of the wire electrode caused by the force of the erosion process can be compensated for. This reduces the gap width and simultaneously increases the precision and work performance of the erosion machine, since there is enhanced material removal in the cutting direction. It is also possible to employ the actuators of the guide heads in a servo system, which holds the spacing between the erosion wire and the workpiece constant.

The piezoceramic actuators are also preferably designed for generating a wire vibration. In this way, the rinsing conditions for the wire electrode can be improved, whereby an enhanced process stability is achieved. Consequently, a higher removal rate or cutting speed results, and, under some circumstances, an improved surface quality as well.

Finally, an EDM machine according to the invention permits methods for spark erosive machining of a workpiece by means of a wire electrode, in which the spatial position of the wire electrode, in particular, its conical angle, is completely or essentially adjusted by performing spherical rotation on two opposing spherical guide heads and/or adjusting the spacing between the spherical guide heads.

Such methods come into consideration, for instance, when the wire stiffness and the flushing of the wire electrode are of slight significance. There are also erosion processes, in the micro erosion range, for instance, in which the motions are so small that the above-described disadvantages remain negligible. In both cases, the methods according to the invention permit particularly simple and accordingly economical machine designs. Simultaneously, a high precision, at least in the micro erosion range, can be guaranteed.

BRIEF DESCRIPTION OF THE DRAWINGS

The invention is described still further on the basis of embodiments and the attached drawing. In the drawings:

FIGS. 7, and 7a–e are each a plan view of another guide head according to the invention with drive means, FIG. 8 is a partial representation of an EDM machine which operates according to a method according to the invention;

FIG. 9 is another partial representation of an EDM machine which operates according to a method according to the invention;

FIG. 10 is a partial representation of a conventional EDM machine.

DETAILED DESCRIPTION

Figure 1:
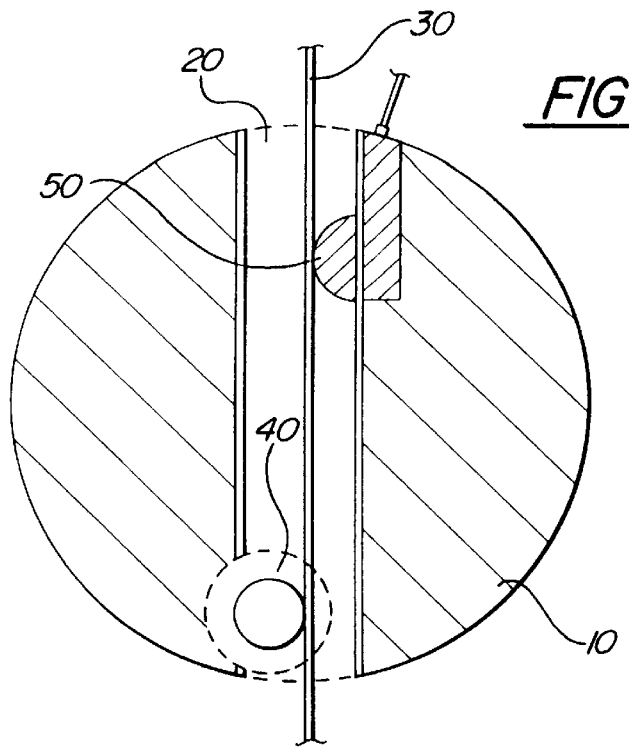
FIG. 1 is a longitudinal section through a guide head according to the invention.

FIG. 1 shows a spherically shaped guide head 10. In its center, a passage opening 20 is formed. A wire 30 is guided through the passage opening 20. An open wire guide 40 serves as guide. The wire 30 is additionally stabilized by a power supply 50.

Figure 2:
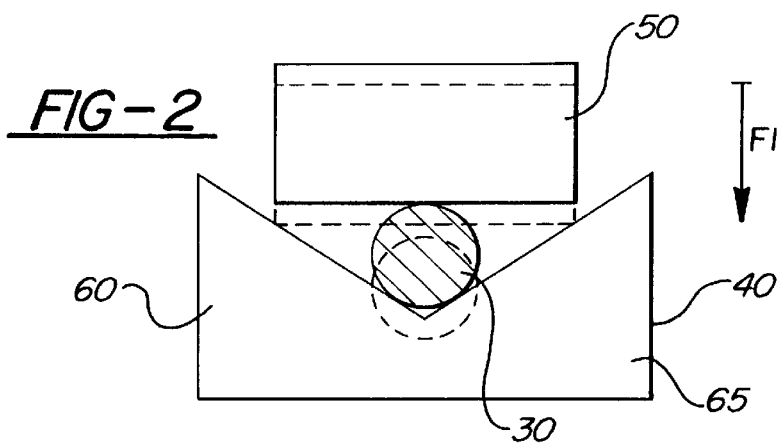
FIG. 2 is a cross section through an open wire guide.

The open wire guide 40 is illustrated in cross section in FIG. 2. The wire 30 lies against two jaws 60,65, which together form a V-shape. In this manner, wires 30 of different diameters can be mounted. The power supply 50 positioned higher up according to FIG. 1 exerts a force F1 on the wire 30. Thereby it is held in the proper position in the center of the open wire guide 40. The open wire guide 40 may, as indicated in FIG. 1, be constructed as a deflection roll with a V-shaped guide groove. Also possible, however, is a stationary guide groove.

Figure 3:
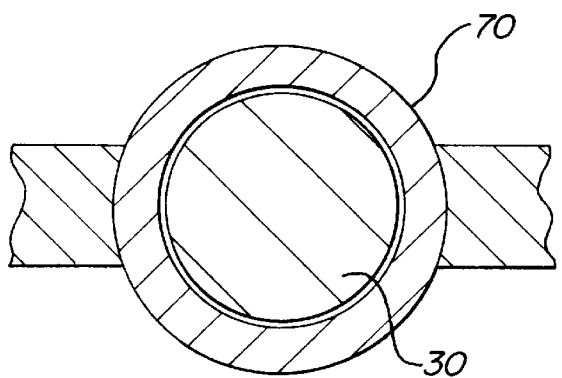
FIG. 3 is a cross section through a closed wire guide.

FIG. 3 shows a closed wire guide 70 that can be used in place of the open wire guide 40. It is constructed as a ring in the center of which the wire 30 is guided.

The open wire guide 40 has the advantage with respect to the closed wire guide 70 that it is suited for different wire diameters. On the other hand, it has the disadvantage that it can exert a force on the wire 30 essentially from only one direction (from the point of the V-groove). In consequence, it must be continually moved around the wire 30 (otherwise the wire 30 would leave the wire guide 40 during the machining of a workpiece).

Figure 4:
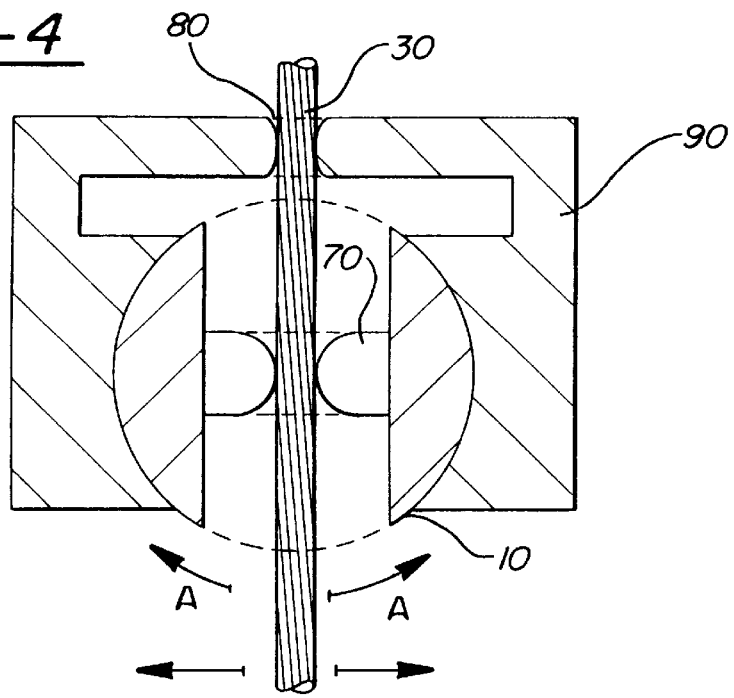
FIG. 4 is a longitudinal section through a guide head according to the invention without drive means.

FIG. 4 shows a spherical guide head 10 which is used without drive means. It is seated in a bearing 90 in a conventional manner suited to spherical rotations and is particularly suited to a closed wire guide 70. The wire 30 first passes through an inlet 80 in a bearing 90. In this way, it is centered with respect to the center point of the sphere. The wire 30 is then guided at the half-way point through the closed wire guide 70 in the interior of the spherical guide head. Supply of power is done via the wire guide 70.

Only the upper guide head 10 is illustrated in FIG. 4. An identical guide head 10' can be arranged in a spherically symmetrical manner at the lower end of the wire electrode. Insofar as relatively slight correction of the wire curvature suffice, a conventional guide head can also be employed there.

The two guide heads 10,10' can, for instance, be spatially positioned by means of a cross carriage (not represented) which acts on the respective bearing 90.

In a situation serving as an example (not illustrated), two guide heads 10,10' are first exactly superimposed in the Z direction. Then the upper guide head is moved in the positive X direction (to the right) and the lower guide head is moved in the negative X direction (to the left). Since there is a tension on the wire 30, a clockwise torque arises in each of the two guide heads 10,10' but not the Y axis.

It is opposed by a frictional force due to the ball bearing 90 and a tensile force as a consequence of the wire positioning at the inlets 80,80' outside the electrode region. As a result, therefore, an equilibrium position, in which the guide heads 10,10' are at least partially oriented along the wire electrode 30, is reached after a spherical rotation A.

Figure 5:
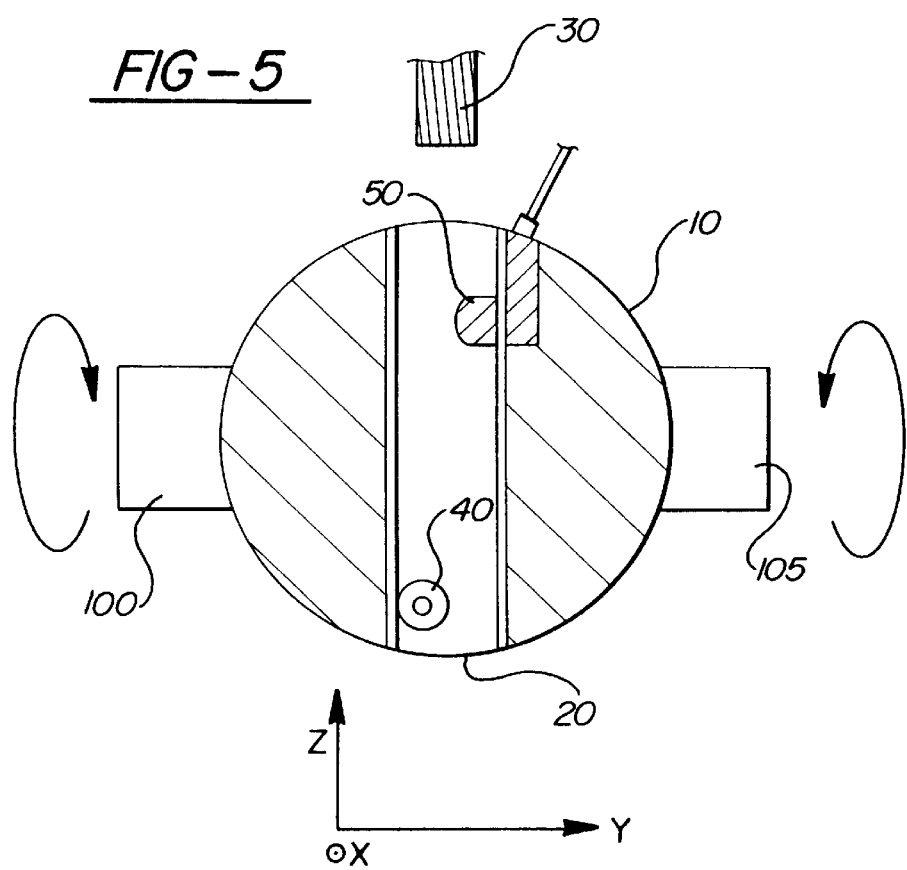
FIG. 5 is a longitudinal section through a guide head according to the invention with drive means.
Figure 6:
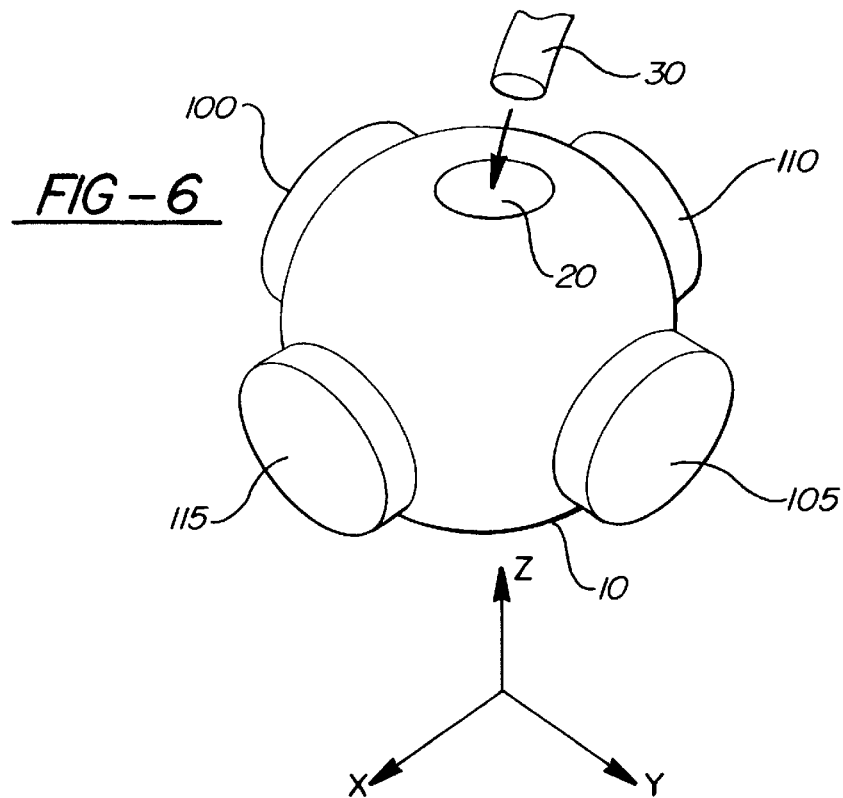
FIG. 6 is a perspectival representation of the guide head from FIG. 5.

A spherical guide head 10 with four drive means 100, 105,110,115 is illustrated in FIGS. 5 and 6. The wire 30 passes through guide head 10 in the Z direction. The four drive means 100–115 act on the outer surface of the guide head 10. They are arranged in opposing pairs along an X and a Y axis (X, Y and Z axis here are mutually orthogonal). The action of the drive means 100–115 is transmitted to the sphere's surface by frictional forces.

Piezoceramic actuators are particular suited as drive means 100–115. Such actuators are utilized, for instance, by Kawasaki Heavy Industries for a spherical piezoceramic motor (see "Piezoelectrically Driven Rotational Joint with Three Degrees of Freedom," "Micro machine" No. 14/1996, publisher: Takayuki Hirano, MMC, 5-F, Niikura Building, 2—2, Kandatsukasacho, Chiyoda-ku, Tokyo 101, Japan). The design of piezoceramic actuators in a spherical ultrasonic motor is further described by Shigeki Toyama ("Development of Spherical Ultrasonic Motor," Annals of CIRP, Vol. 45/1/1996, pp. 27–30 with further references), reference is also made to Kumada, A, 1985, "A piezoelectric ultrasonic motor," Jpn. J. Appl. Phys. 24: 739–744; Toyama, S., Hatae, S., 1992, "Development of a new ultrasonic for a robot manipulator by an ultrasonic motor," J. Japan Robot Association, 10-6: 771–780; Toyama, S. et al., 1991, "Development of a spherical ultrasonic motor for a robot manipulator," Proc. Of robot and mechatronics symposium 94–95 (A); Toyama, S. et al., 1994, "Multi degree of freedom Spherical Ultrasonic Motor," Proc. of IECON '94, Bologna, 899–904 (A).

Two respective opposing piezoceramic actuators 100, 105 or 110, 115 simultaneously generate a torque in the same direction about the Y or X axis. The friction between the respective remaining two actuators 110,115 or 100,105, respectively, and the spherical guide head 10 can simultaneously be reduced or eliminated. It is also possible to operate both pairs of actuators simultaneously (cf., for instance, Shigeki Toyama, op. cit., p. 28). The passage opening 20 of the spherical guide head 10 can be brought into any arbitrary inclination with respect to the Z axis by alternating or simultaneous use of both pairs of actuators 100,105 and 110,115.

The functioning of piezoceramic actuators is extensively described in the aforementioned publication. References to additional descriptions are also found there. Their fundamental principle is based on the deformability of piezoceramic elements by voltages.

Figure 7:
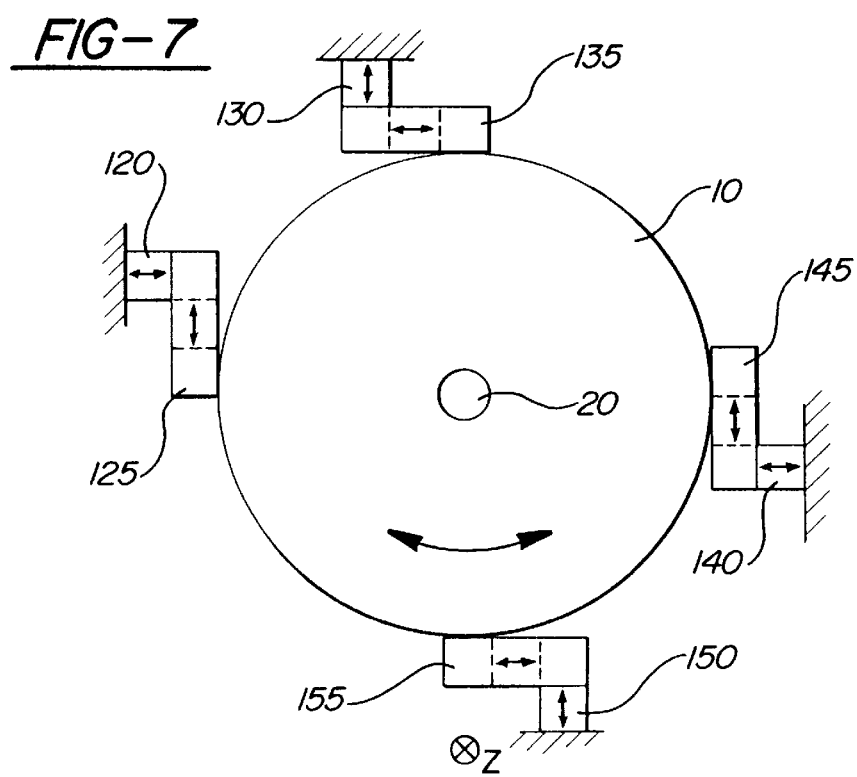

In the case of an open wire guide 40, the wire 30, as discussed above, must always be maintained in the center of the V groove 60,65. For this purpose, it must be possible to rotate the guide head 10 additionally about the Z axis. FIG. 7 shows a drive unit suited to this, likewise formed of piezoceramic elements 120,125, 130,135, 140,145 and 150, 155.

The piezoceramic elements 120–155 are shaped in this case as rectangular prisms whose length can be varied. Such elements are known from, for instance, the publication "Ultraprecision Feed System Based on Walking Drive," (Toshimiki Moriwaki et al., Annals of the CIRP Vol. 45/1/1996, p. 505ff). They are used there to form a motor of the inchworm or walking type.

Two such piezoceramic elements 120,125 or 130,135 or 140,145 or 150,155 are arranged at right angles. Each of these pairs is connected via an element 120,130,140,150 to a wall surrounding the spherical guide head 10 (for better comprehensibility, these elements 120,130,140,150 will be referred to below as wall elements). The respective remaining element 125,135,145,155 (below: tangential element) makes tangential contact with the spherical guide head 10.

If one of the wall elements 120,130,140,150 is shortened, the respective associated tangential element 125,135,145, 155 moves away from the guide head 10. Conversely, the tangential element 125,135,145,155 is again brought back to the guide head 10 by an elongation of the wall element 120,130,140,150.

If a tangential element 125,135,145,155 is in contact with the guide head 10 and changes its length, a tangential acceleration is transferred via frictional forces onto the guide head 10. The latter is consequently set in rotational motion.

The dimensions of such a length change of a piezoceramic element are relatively small, however. Nevertheless, in order to obtain a uniform and arbitrarily large rotation of the spherical guide head 10, several pairs, each composed of a wall element and a guide element, work together. The image of an analog clock will be used below to make the description of this interaction more explicit.

Around the spherical guide head 10, four pairs, each consisting of a tangential element 125,135,145,155 and a rectangular wall element 120,130,140,150, are arranged. One pair is arranged at 3 o'clock, 6 o'clock, 9 o'clock and 12 o'clock, respectively. The tangential elements extend from "just before three" to "just after three," from "just before six" to "just after six," and so on. In the 3 o'clock pair, the wall element 140 acts "just after three" on the tangential element 145, "just before six" for the 6 o'clock pair 150,155, "just after nine" for the 9 o'clock pair 120,125 and "just before twelve" for the 12 o'clock pair 130,135.

The seating of the spherical wire guide head 10 is accomplished in this example exclusively by the tangential elements 125,135,145,155. At any time, therefore, at least two opposing tangential elements 125,145 or 135,155 must be acting on the spherical wire guide head 10. How a counterclockwise rotation can be performed under these conditions can be illustrated on the basis of FIGS. 7a–7e. Here the wall elements 120,130,140,150 are not illustrated for the sake of simplicity. Their function consists in respectively withdrawing the tangential elements 125,135,145,155, from the spherical wire guide head 10 by contraction or in moving the tangential elements 125,135,145,155 up to the spherical wire guide head 10 by expansion. Furthermore, the tangential elements 125,135,145,155 are referred to below for the sake of simplicity as the 3, 6, 9 and 12 o'clock elements, respectively, and the spherical wire guide head 10 as the guide head.

In a starting situation (FIG. 7a), the 3 o'clock and the 9 o'clock elements 125,145 are engaged with the guide head 10 and are shortened in their longitudinal extent. The 6 o'clock and the 12 o'clock elements 135,155, on the other hand, do not touch the guide head 10 and are stretched in their longitudinal extent.

Now the 3 o'clock and the 9 o'clock element 125,145 are elongated counterclockwise (FIG. 7b). Consequently the guide head 10 performs a counterclockwise rotation.

Simultaneously, the 6 o'clock and the 12 o'clock element are contracted.

As soon as the 3 o'clock and the 9 o'clock elements 125,145 have reached a maximum extension, the 6 o'clock and the 12 o'clock elements 135,155 are moved up to the guide head 10 (FIG. 7c). At least during this instant, therefore, the guide head 10 is simultaneously contacted by all four tangential elements 125,135,145,155.

After the seating of the guide head 10 by the 6 o'clock and the 12 o'clock elements 135,155 has been guaranteed, the 3 o'clock and the 9 o'clock elements 125, 145 are withdrawn from the guide head 10 (FIG. 7d).

Then the counterclockwise rotation of the guide head 10 is continued by extension of the 6 o'clock and the 12 o'clock elements 135,155 (FIG. 7e). During this time, the 3 o'clock and the 9 o'clock elements are again contracted.

This cycle is continued until the rotation about the Z axis has reached the desired extent. At this point all the piezoceramic elements 120–155 are stopped. The guide head 10 is consequently held in place at the position that has been reached.

Rotations in the opposite direction are done according to the same principle.

Continuous rotations can also be produced in place of such a "two-cycle driving." In the present example this would be possible if at every point [any] three tangential elements 125,135,145,155 would act on the spherical wire guide head 10. In a starting situation, one of the three elements 125,135,145,155 would be completely contracted, one extended one-third and one extended two-thirds. During a rotation, the three elements would extend with equal speed. As soon as the initially two-thirds extended element had reached its full length, it would be replaced by the remaining fourth element, which would have to be completely contracted, and so on. In comparison to the above described "two-cycle driving," such a solution with four tangential elements 125,135,145,155 would require differing extension or contraction rates. This could in turn be avoided by a different number of elements.

Thus far, spherical guide heads 10 according to the invention which can be rotated either about the X and Y axes or about the Z axis only have been represented on the basis of FIGS. 5–6 or FIGS. 7–7e. The two embodiments, however, can also be combined.

It is also possible to perform small translations of the guide head 10 by means of piezoceramic elements. Either the existing piezoceramic elements 100–155 can be appropriately constructed for this purpose or additional elements can be used. One could, for instance, enlarge the wall elements 120,130,140,150 and simultaneously connect the piezoceramic actuators 100–115 (for rotations about the X and Y axes) via additional wall elements (not shown) to a wall surrounding the guide head.

A translation of the guide head 10 in one of the spatial directions is obtained, for instance, by simultaneously lengthening the 9 o'clock a wall element 120 in FIG. 7 and shortening the opposing 3 o'clock wall element 140. The remaining wall elements would have to be correspondingly controlled.

It is also practical for such an embodiment to be connected to a wire position sensor. An appropriate wire sensor is described, for instance, in German Patent No. DE 28 26 270 A1 (AGIE). In this manner, deviations of the wire electrode 30 from its nominal position can be quickly and precisely compensated.

It is also possible to generate an artificial wire vibration by means of the actuators. In this way, the flushing effect can be increased and the disposal of erosion residues improved. The generation of high-frequency motion by means of piezoceramic actuator is described, for instance, in the publication "Ultrasound powers minimotors" (Arno Nöldechen, Technische Rundschau 43/86, p. 112).

Finally, an alternative possibility for utilizing spherical guide heads 10,10' is illustrated in FIGS. 8 and 9. Here the guide heads 10,10' were each used for positioning the wire electrode 30.

In FIG. 8, a conical shape is set by means of differing inclination of the guide heads 10,10' . In FIG. 9, a cylindrical cut is executed in a workpiece 160 by a synchronous rotational motion of both guide heads.

In an EDM machine designed in this manner, machine shafts required thus far can be replaced by piezoceramic actuators 170,175,180,185. This is interesting above all in the field of micro erosion. There the errors caused by the wire stiffness and an asynchronous flushing remain negligibly small. Along with reducing the number of conventional machine shafts, on the other hand, stiffness problems deriving from these axes are also reduced.

What is claimed is:

1. A wire guide head for an electrical wire discharge machine of the type wherein a wire is guided between an upper and a lower wire guide head, said wire guide head comprising:

a body that is at least partially spherical, the body having a wire passage defined therethrough;

a wire guide disposed in said wire passage for guiding the wire in said passage;

a support for rotatably supporting said body such that said passage can be directed in a plurality of directions; and a drive means for spherically rotating said body to adjust the direction of said passage.

2. An electrical discharge machine according to claim 1, in which piezoceramic actuators are provided as the drive means for the body.

3. An electrical discharge machine according to claim 2 in which the piezoceramic actuators are constructed such that they produce rotational motions of the body by frictional forces.

4. An electrical discharge machine according to claim 2 in which the piezoceramic actuator comprises a series of piezoceramics which form a motor of the inchworm or walking type.

5. An electrical discharge machine according to claim 2 in which the piezoceramic actuators are constructed such that they bring about translational motions of the body by changing their spatial shape.

6. An electrical discharge machine according to claim 2 in which the piezoceramic actuators are coupled to at least one wire position sensor.

7. An electrical discharge machine according to claim 2 in which the piezoceramic actuators are designed to generate a wire vibration.

* * * * *